(12) United States Patent
Stallings

(10) Patent No.: US 8,082,566 B2
(45) Date of Patent: Dec. 20, 2011

(54) INPUT BASED FUNCTION PREVIEW APPARATUSES, SYSTEMS, AND METHODS

(75) Inventor: Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 524 days.

(21) Appl. No.: 11/959,811

(22) Filed: Dec. 19, 2007

(65) Prior Publication Data

US 2009/0165073 A1    Jun. 25, 2009

(51) Int. Cl.
 H04N 5/44    (2011.01)
 H04N 5/445   (2011.01)
 H04N 7/16    (2011.01)

(52) U.S. Cl. ............ 725/37; 725/40; 725/139; 725/151; 348/734

(58) Field of Classification Search ............. 725/37, 725/40, 139, 151; 348/734
See application file for complete search history.

(56) References Cited

U.S. PATENT DOCUMENTS

| | | | |
|---|---|---|---|
| 6,215,417 B1 * | 4/2001 | Krass et al. | 341/20 |
| 6,574,083 B1 * | 6/2003 | Krass et al. | 361/115 |
| 7,577,974 B2 * | 8/2009 | Grossman et al. | 725/62 |
| 2006/0132656 A1 * | 6/2006 | Yamamoto et al. | 348/571 |
| 2007/0032967 A1 * | 2/2007 | Feen et al. | 702/47 |
| 2007/0052691 A1 | 3/2007 | Zadesky et al. | |
| 2007/0129046 A1 * | 6/2007 | Soh et al. | 455/403 |
| 2007/0285284 A1 * | 12/2007 | Matteo et al. | 341/22 |

OTHER PUBLICATIONS

International Search Report and Written Opinion received in International Application No. PCT/US2008/85011, Jan. 30, 2009.

* cited by examiner

*Primary Examiner* — James R Sheleheda

(57) ABSTRACT

An exemplary system includes a processing subsystem. The system further includes at least one sensing facility and a control facility within an input device configured to communicate with the processing subsystem. The sensing facility is configured to detect a first type of user input and a second type of user input. The control facility is communicatively coupled to the sensing facility and is further configured to provide a first control signal in response to detection of the first type of user input, and a second control signal in response to detection of the second type of user input. The processing subsystem is configured to execute a function associated with the sensing facility in response to the second control signal, and to provide a preview event for the function in response to the first control signal. In certain embodiments, the preview event includes information descriptive of the function.

27 Claims, 11 Drawing Sheets

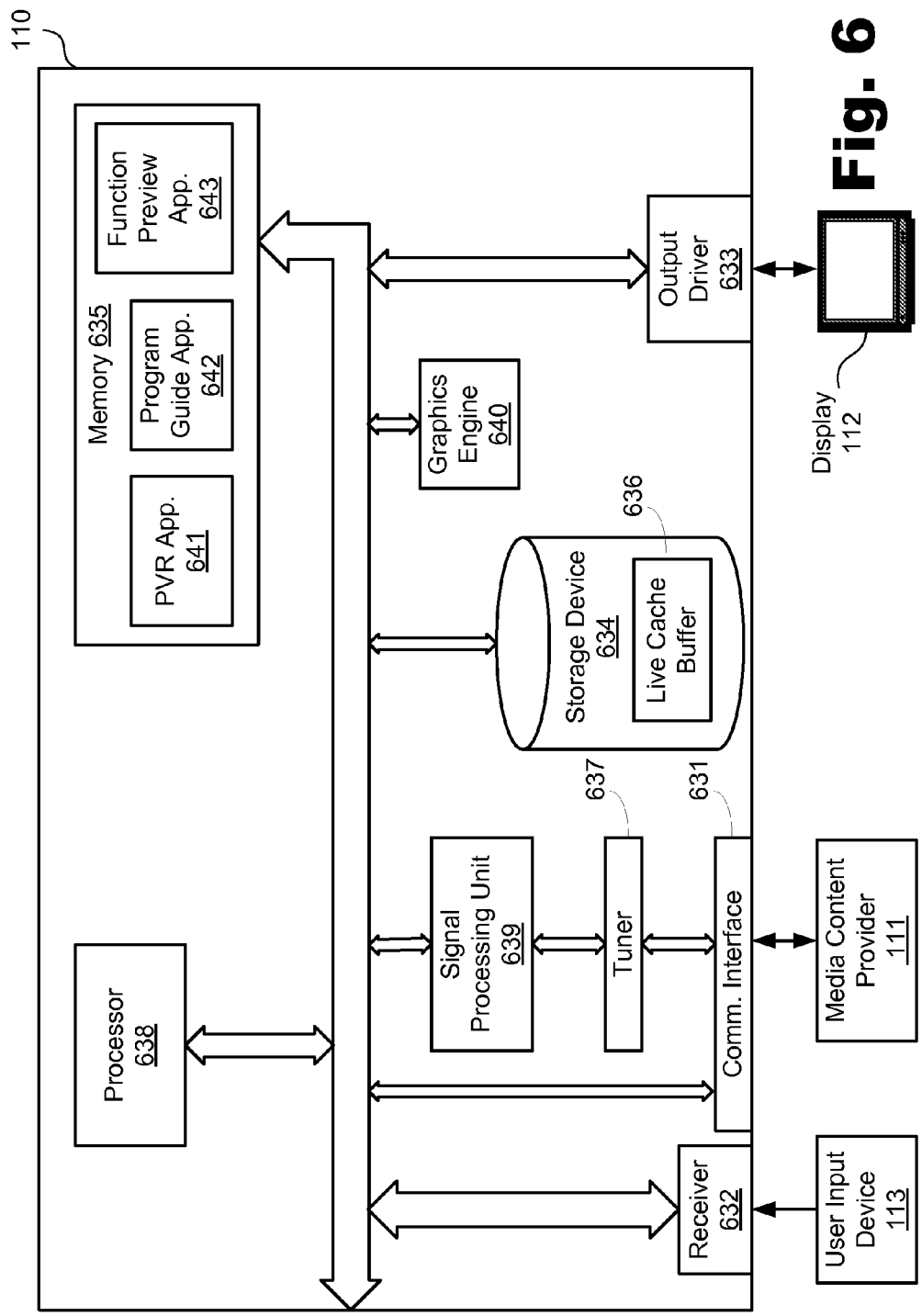

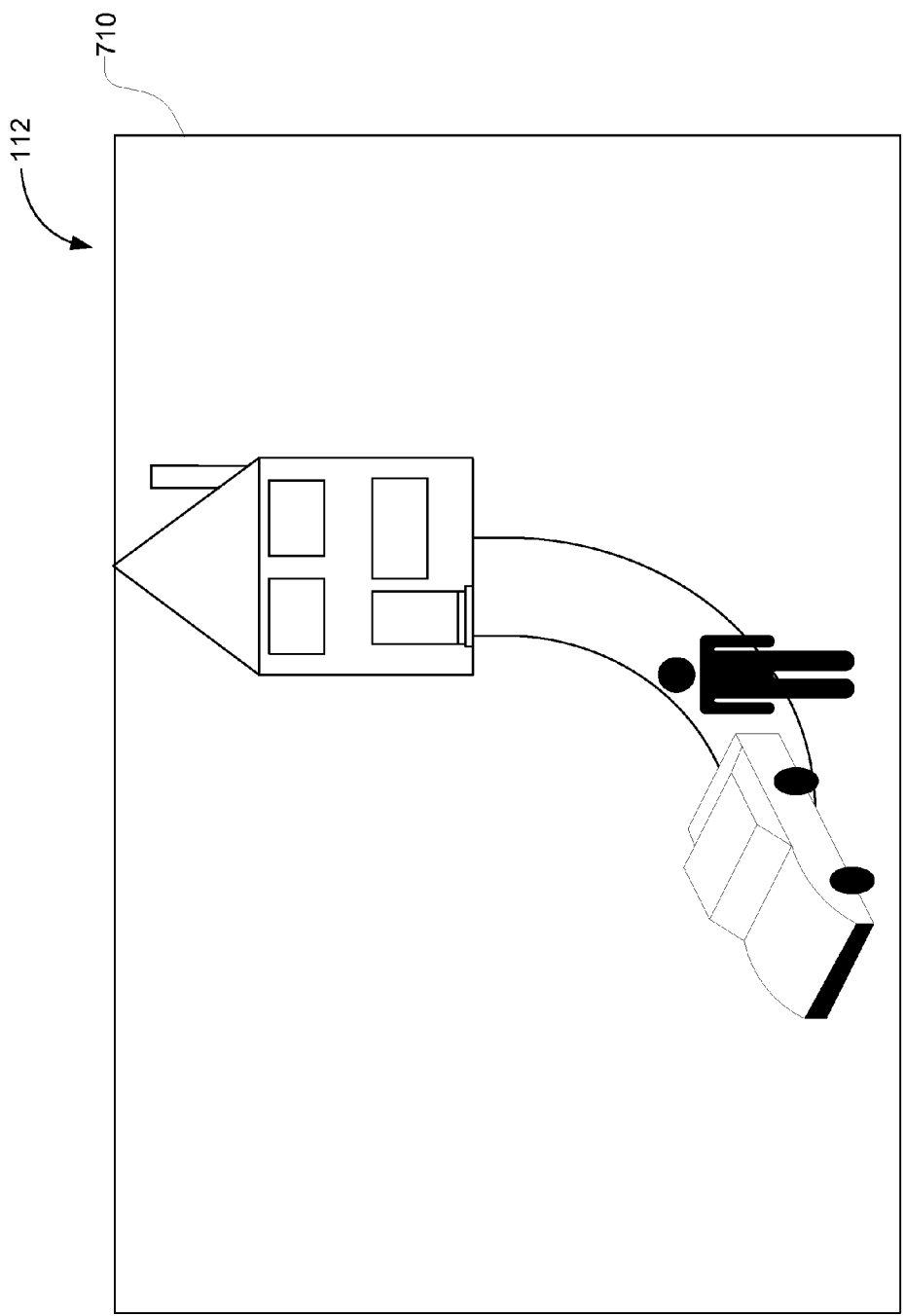

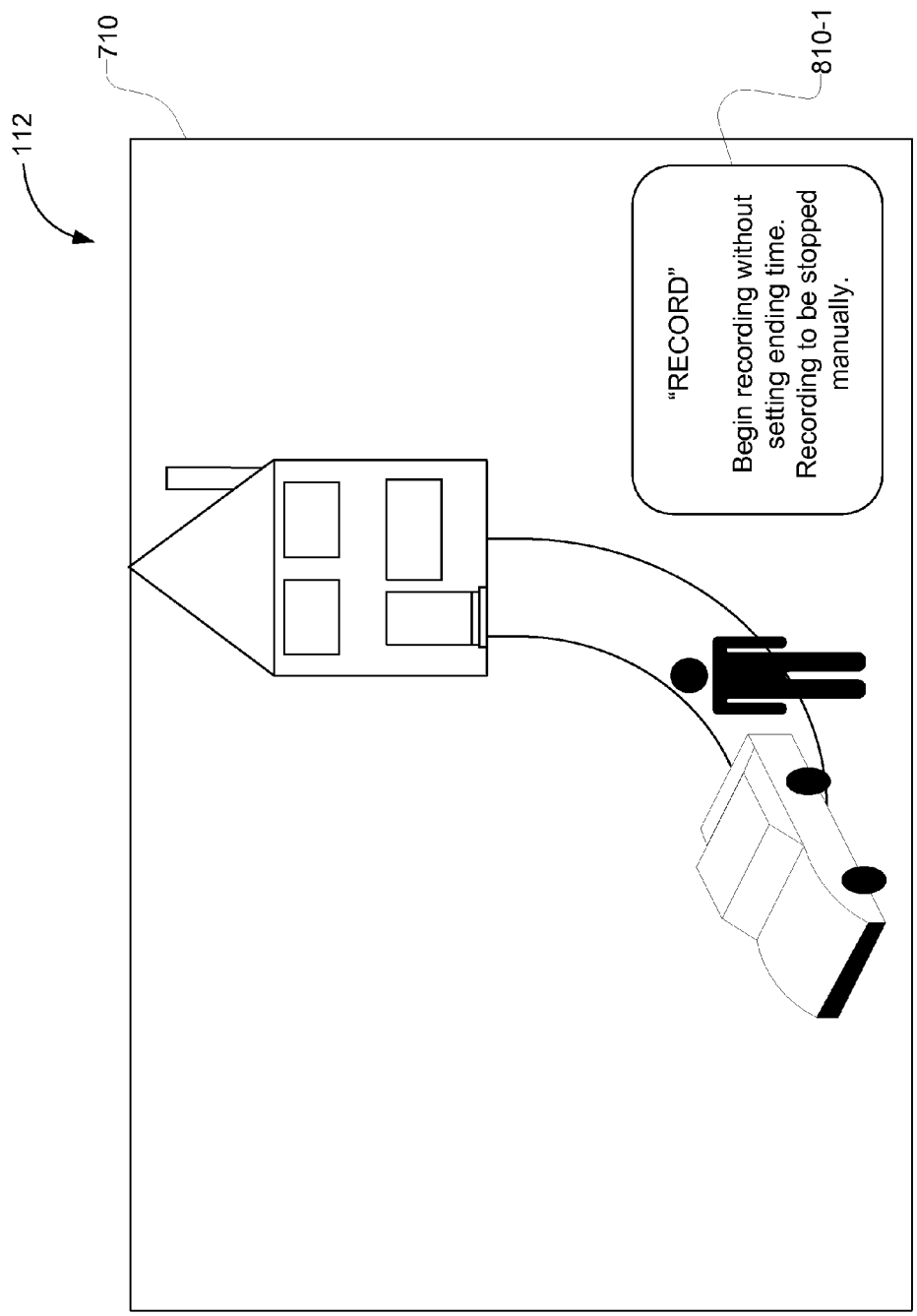

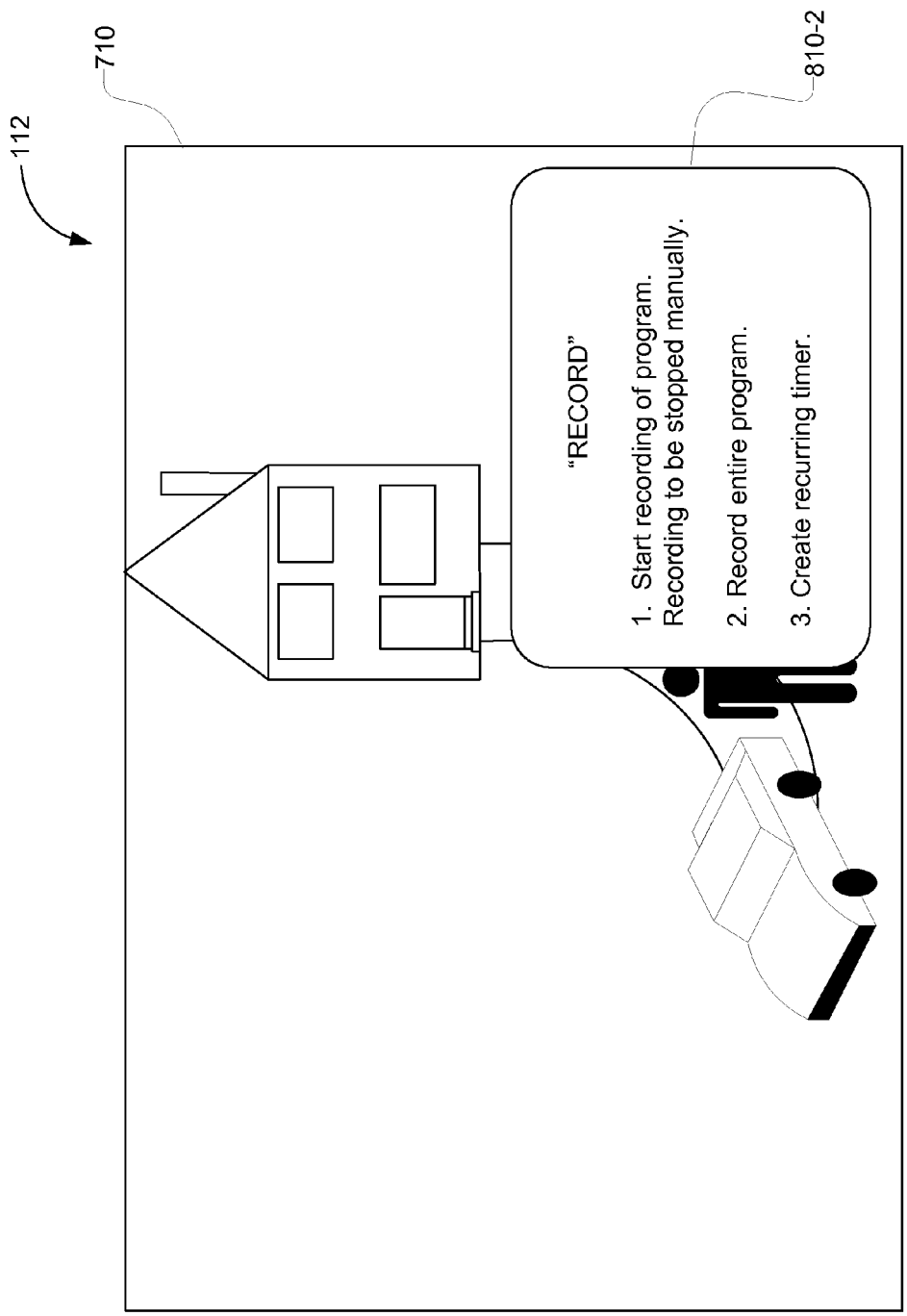

_US 8,082,566 B2_

INPUT BASED FUNCTION PREVIEW APPARATUSES, SYSTEMS, AND METHODS

BACKGROUND INFORMATION

Designers working on devices such as remote control devices, mobile telephone handsets, mobile entertainment devices and other portable devices, continue to face challenges as these devices increase in complexity and functionality and decrease in size. Buttons on these devices typically include textual labels to help users identify the functions that are associated with specific buttons. However, with the increased functional capabilities and decreased sizes of the devices, it has become increasingly difficult to adequately label the buttons. Consequently, it has also become increasingly difficult for users to understand the functions that may be triggered by the selection of specific buttons.

In a more specific example, the set-top box ("STB") has become an important computing device for accessing media content services and the media content within those services. An STB is usually configured to provide users with access to a large number and variety of media content choices offered by a provider. For example, a user may choose to experience a variety of broadcast television programs, pay-per-view services, video-on-demand programming, Internet services, and audio programming via an STB.

With the large number of media content choices offered by providers and the various features and functionality provided to users for controlling and viewing the media content, it has become difficult to provide a user input device, such as a remote control device for an STB, that is reasonable in size and complexity, and yet provides adequate information to the users about the various functions associated with the buttons on the device. This can result in a poor user experience. Even more problematically, it can lead to users experiencing unintended results by mistakenly selecting the wrong buttons.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate like or similar elements.

FIG. 6 is a block diagram of an exemplary media content processing subsystem.

FIG. 7 illustrates a viewing screen of an exemplary display.

FIG. 8A illustrates an exemplary preview event displayed on the viewing screen of FIG. 7.

FIG. 8B illustrates another exemplary preview event displayed on the viewing screen of FIG. 7.

DETAILED DESCRIPTION OF PREFERRED EMBODIMENTS

Figure 1:
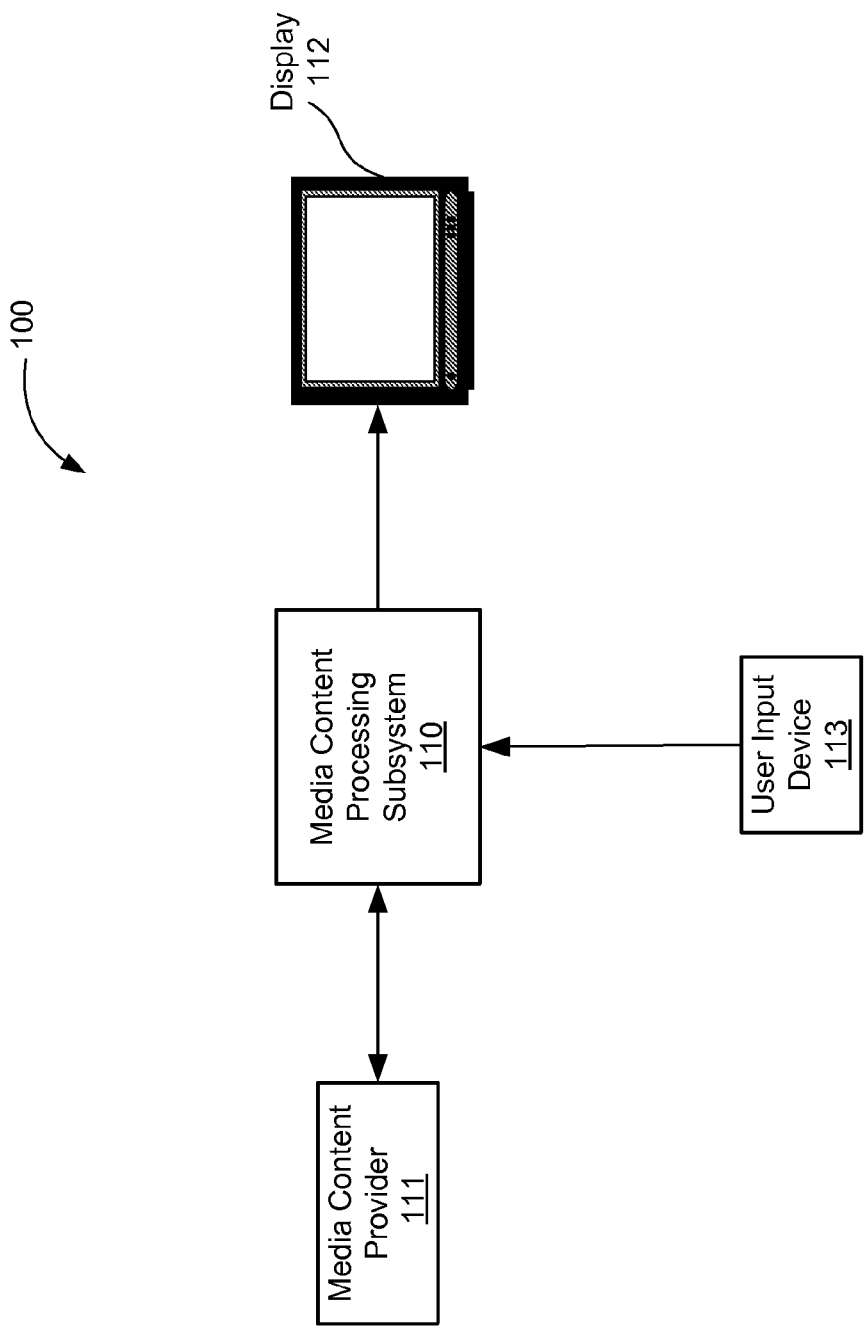
FIG. 1 illustrates an example of a media content access system.

Exemplary input based function previewing apparatuses, systems, and methods are disclosed herein. In certain embodiments, a system may include a processing subsystem configured to provide a graphical user interface to a display for presentation to a user. The system may further include at least one sensing facility and a control facility within a user input device configured to communicate with the processing subsystem. The sensing facility may be configured to detect a first type of user input and a second type of user input. The control facility may be configured to provide a first control signal in response to detection of the first type of user input, and to provide a second control signal in response to detection of the second type of user input. The processing subsystem may be configured to execute a function associated with the sensing facility in response to the second control signal, and to provide a preview event for the function in response to the first control signal. The preview event may include displaying content descriptive of or otherwise associated with the function in the graphical user interface. Accordingly, a user may utilize the input device to provide a first type of input to initiate a preview event for a function, and a second type of input to initiate execution of the function. The terms "sensing facility," "function," and "preview event" are more fully defined and described below.

In certain embodiments, the sensing facility may include a mechanical contact button configured to capture the second type of user input, and at least one sensor configured to capture the first type of user input. The sensor may include, for example, a capacitance sensor, a light sensor, a heat sensor, or a photo sensor film configured to detect an object (e.g., a user finger or thumb) positioned proximate to a surface of the mechanical contact button, such as an object touching or hovering within a certain distance of the sensor. The terms "touching" and "hovering" may have particular meaning as defined below.

The exemplary apparatuses, systems, and methods described herein may help provide a connected, intuitive, and satisfying user experience. For example, when a user positions a thumb or finger proximate to a button (e.g., touching or hovering within a certain distance of the button) on a user input device, the input device may detect and capture the user action as a first type of user input. The input device may generate and provide a control signal configured to trigger a preview event for a function associated with the button. For example, a graphical user interface (e.g., a pop-up window) may be displayed and may include information descriptive of or otherwise associated with the function. Accordingly, the user may preview information about the function before actuating the button to initiate execution of the function. This may facilitate a quality user experience by providing preview information in advance of selection and execution of a function and by helping to reduce confusion typically associated with limited and unclear textual labels on a user input device.

Components and processes of exemplary embodiments will now be described in more detail with reference to the drawings.

FIG. 1 illustrates an example of a media content access system 100 (or simply, "system 100"). As shown in FIG. 1, system 100 may include a media content processing subsystem 110 (or simply, "processing subsystem 110") configured to communicate with and receive a signal or data stream containing data representative of media content and/or program guide data from a media content provider 111. The processing subsystem 110 and the media content provider 111 may communicate using any known communication technologies, including known devices, media, and protocols supportive of remote data communications. Examples of such include, but are not limited to, data transmission media, communications devices, server devices, client devices, Transmission Control Protocol ("TCP"), Internet Protocol ("IP"), File Transfer Protocol ("FTP"), Telnet, Hypertext Transfer Protocol ("HTTP"), Ethernet, wireless technologies, fiber optic technologies, and other suitable communications technologies.

Figure 2:
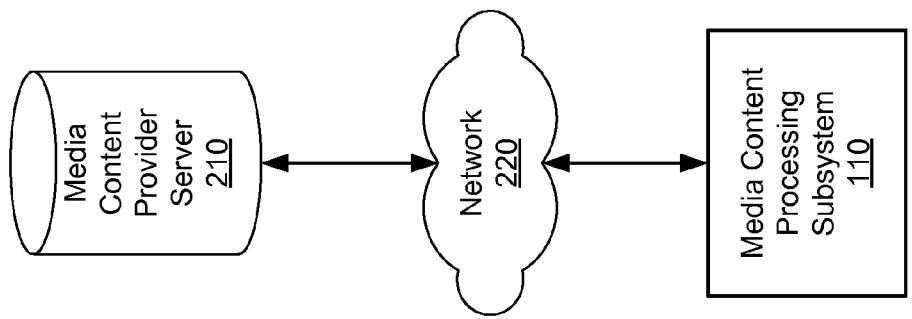
FIG. 2 illustrates an exemplary media content provider network.

In certain embodiments, media content provider 111 may include at least one media content provider server 210 configured to communicate with processing subsystem 110 by way of a network 220 (and communications links thereto), as shown in FIG. 2. The network 220 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a voice network (e.g., a SS7 or VoIP network) a provider-specific network (e.g., a Verizon® FIOS® network and/or a TiVo network), an optical fiber network, any other suitable network, and any combination of these networks. In some alternative examples, the processing subsystem 110 may be connected directly to the media content provider server 210.

Returning to FIG. 1, media content provider 111 may be configured to provide various types of media content and/or program guide data to the processing subsystem 110 using any suitable communication technologies, including any of those described herein. The media content may include one or more media content instances, or one or more segments of the media content instance(s). The term "media content instance" will be used herein to refer generally to any television program, on demand program, pay-per-view program, broadcast media program, IPTV content, commercial, advertisement, video, movie, song, video game, image, photograph, sound, or any segment, component, or combination of these or other forms of media content that may be viewed or otherwise experienced by a user.

The processing subsystem 110 may be configured to process a media content stream provided by the media content provider 111, including causing a media content instance, or one or more components (e.g., video and/or audio components) of a media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the processing subsystem 110 may provide a signal to a display 112 so that the display 112 may present media content for experiencing by the user.

The display 112 may display, play, or otherwise present the content for experiencing by the user. The display 112 may include, but is not limited to, a television, computer monitor, mobile phone, handheld device, display screen, or any other device configured to present content to a user, including, for example, media content and/or preview information for functions that may be selected by a user with the input device 113.

The media content provider 111 may also provide program guide data, and the processing subsystem 110 may be configured to process the program guide data, including generating and providing a program guide graphical user interface including programming information to the display 112 for presentation to the user.

The processing subsystem 110 may be controlled, at least in part, by way of a user input device 113, such as a remote control device, configured to communicate with the processing subsystem 110. In certain examples, the user input device 113 may include one or more sensing facilities (e.g., buttons and/or other input mechanisms) configured to detect user input, including different types of user input. The input device 113 may also include a control facility configured to generate and transmit control signals to the processing subsystem 110 based on the user input. As described below, the processing subsystem 110 may be configured to execute certain functions associated with the sensing facilities in response to the control signals.

While an exemplary system 100 is shown in FIG. 1, the components illustrated in FIG. 1 are not intended to be limiting. Indeed, additional or alternative components and/or implementations may be used, as is well known. Components of system 100 will now be described in additional detail.

Figure 3:
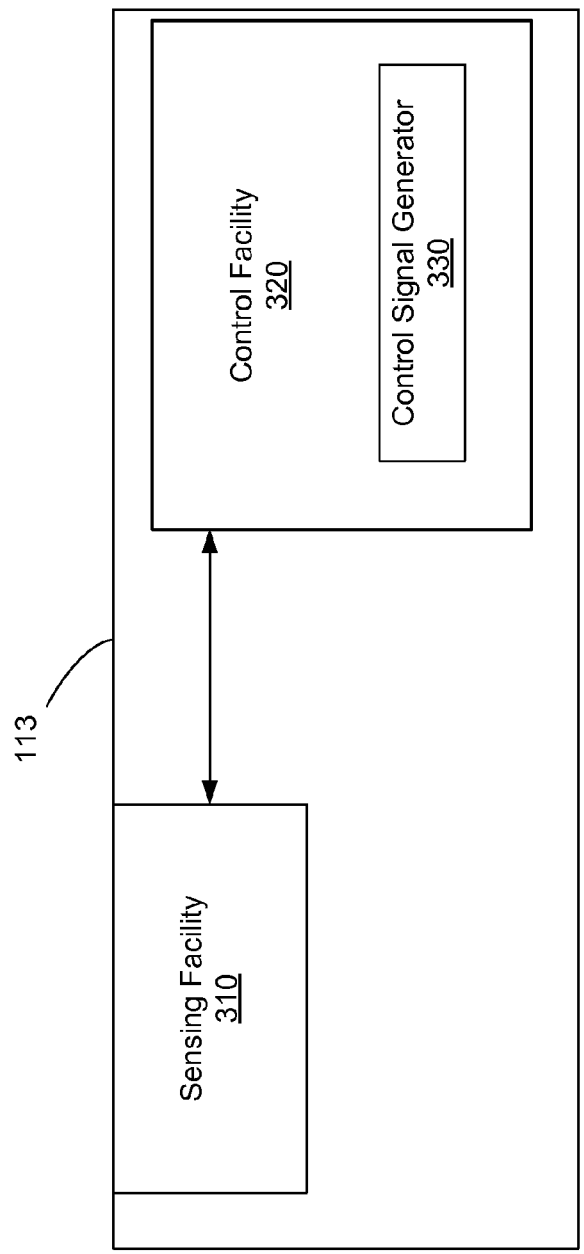
FIG. 3 is a block diagram of exemplary components of an exemplary user input device.

With reference to FIG. 3, a block diagram of an exemplary user input device 113 is shown. The components of the user input device 113 shown in FIG. 3 may form one or more apparatuses and/or facilities configured to detect distinct types of user input and to generate control signals based on the user input. The control signals may be configured to trigger execution of certain functions and/or events, including preview events associated with the functions. The components of the user input device 113 may be implemented as hardware, software, and/or a combination of hardware and software configured to perform any of the user input device processes described herein.

As illustrated, at least one sensing facility 310 and a control facility 320 communicatively coupled to the sensing facility 310 may be implemented within the user input device 113. Sensing facility 310 may be configured to capture various user inputs, or types of user input. Possible user inputs may include, for example, a movement of a component of the sensing facility 310 (e.g., a mechanical contact button) to a depressed position, a touching of a component of the sensing facility 310, a detection of an object positioned proximate to a surface (e.g., hovering within a certain distance of the surface) of the sensing facility 310, a detection of light, heat, or pressure, or any other type of user input, including any combination of the foregoing. Different user inputs may be categorized into user input types, which may be used to determine actions that will be performed in response to the inputs.

In certain embodiments, for example, sensing facility 310 may be configured to capture a plurality of user inputs such as a first type of user input and a second type of user input. As described below, a first type of user input may trigger execution of certain actions, and a second type of user input may trigger execution of other actions. For example, a particular type of user input may trigger execution of a function associated with sensing facility 310, and another type of user input may trigger execution of a preview event for the function, as described below.

In certain embodiments, a first type of user input may include an object touching a component of the sensing facility 310, and a second type of user input may include an object depressing a component of the sensing facility 310. In other embodiments, a first type of user input may include an object hovering over a component of the sensing facility 310, and a second type of user input may include an object touching a component of the sensing facility 310. In other embodiments, a first type of user input may include an object hovering over or touching a component of the sensing facility 310, and a second type of user input may include an object depressing a component of the sensing facility 310. In other embodiments, a first type of user input may include an object hovering over a component of the sensing facility 310, and a second type of user input may include an object touching or depressing a component of the sensing facility 310. These examples are illustrative only. Input types may be defined differently in other embodiments.

In certain embodiments, an object hovering within a predefined distance of a component (e.g., a surface) of the sensing facility 310 may be referred to as a "hover state," which the sensing facility 310 may detect as a hover-state input. An object touching a component (e.g., a surface) of the sensing facility 310 may be referred to as a "touch state," which the sensing facility 310 may detect as a touch-state input. An object moving a component (e.g., a mechanical contact button) into an actuated position (e.g., a depressed position) may be referred to as an "actuated state," which the sensing facility 310 may detect as an actuated-state input. These inputs may be categorized as different types of input in any of the configurations described above.

Sensing facility 310 may include one or more sensors or sensor arrangements configured to capture different user inputs and input types. Examples of sensors that may be employed in sensing facility 310 include, but are in no way limited to, a single mechanical contact button (e.g., a button, key, or other physically actionable mechanism), a plurality of mechanical contact buttons, one or more capacitance sensors, light sensors, heat sensors, and photo sensor films, other suitable sensors, or any combination or sub-combination of the above.

Sensors of sensing facility 310 may be configured to detect different types of user inputs. For example, sensing facility 310 may include one or more sensors or sensor combinations configured to detect a first type of user input, and one or more other sensors or sensor combinations configured to detect a second type of user input. As an example, sensing facility 310 may include a mechanical contact button configured to capture a particular type of user input (e.g., a movement of the button to a depressed position), and one or more other sensors (e.g., a capacitance sensor) configured to capture another type of user input (e.g., an object touching or hovering proximate to the other sensors). As another example, sensing facility 310 may include a haptic computer interface configured to capture a particular type of user input (e.g., an object touching a certain area of the haptic computer interface), and one or more other sensors (e.g., a capacitive sensor) configured to capture another type of user input. The haptic computer interface may be configured to provide tactile feedback to a user so as to allow the user to sense by touch one or more buttons such as is described in U.S. patent application Ser. No. 11/771,665, filed Jun. 29, 2007 and titled "Method and System for Providing a Haptic Computer Interface," the disclosure of which is hereby incorporated by reference in its entirety.

Figure 4:
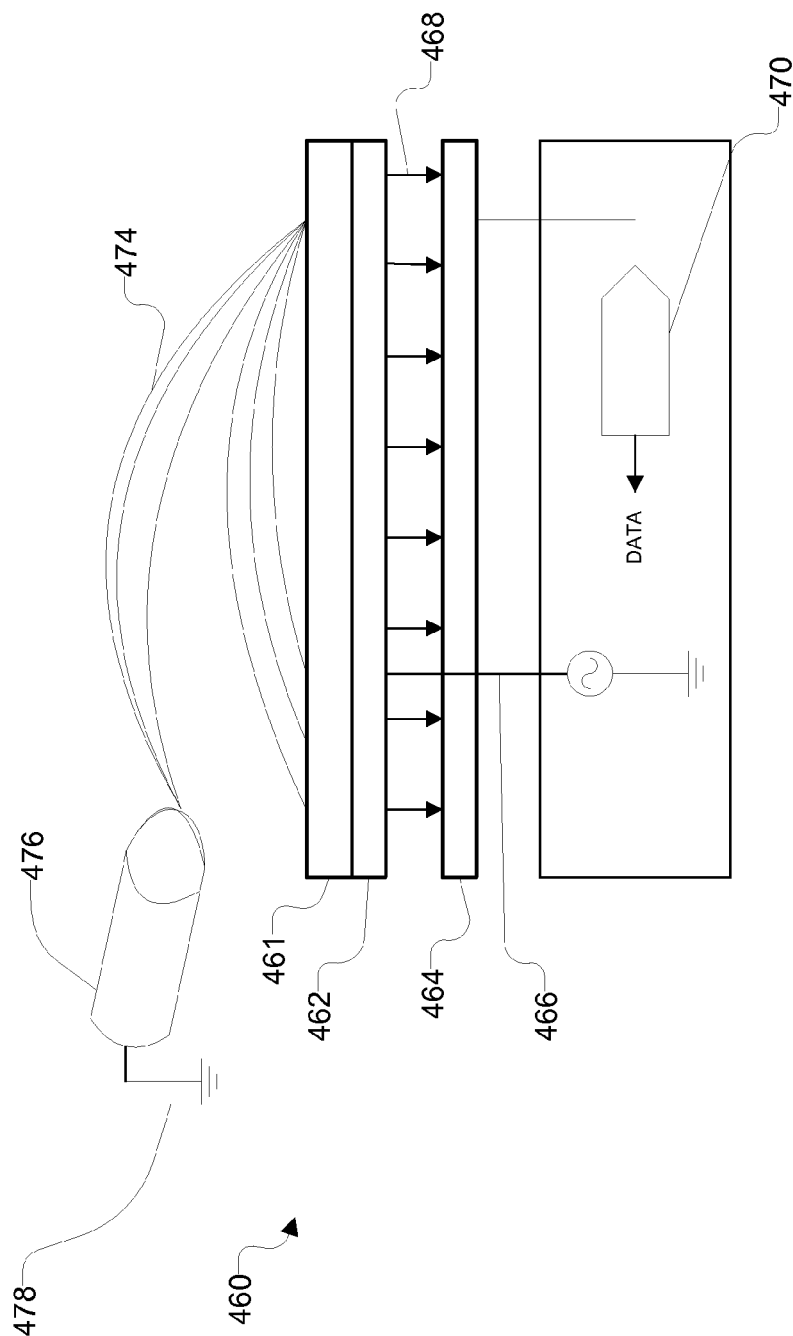
FIG. 4 illustrates an exemplary sensor for a user input device.

FIG. 4 illustrates an exemplary sensor that may be implemented in sensing facility 310 and may be used to detect when an object touches or is positioned proximate to a surface of the sensing facility 310 (e.g., a surface of a mechanical contact button included in the sensing facility 310). FIG. 4 shows an exemplary capacitance sensor 460 that may be used to detect an object touching and/or hovering proximate to the sensing facility 310. Capacitance sensor 460 may include a plastic cover 461 extended over the sensor 460 and configured to function as a protective surface. Sensor 460 may also include a transmitter 462 and a receiver 464. The transmitter 462 and the receiver 464 may each include metal traces (or other electrically conductive traces) formed on layers of a printed circuit board ("PCB"). An excitation signal path 466 may be connected to the transmitter 462, such that an electric field 468 is formed between the transmitter 462 and the receiver 464. The electric field 468 may be substantially concentrated between the transmitter 462 and the receiver 464. The strength of the electric field 468 may be measured by a capacitance-to-digital converter 470.

Sensor 460 may be configured such that a fringe electric field 474 may extend from the transmitter 462, out of the PCB, and terminate back at receiver 464, such that the fringe electric field 474 is positioned over the plastic cover 461 surface of the sensor 460. When an object 476 (e.g., a human finger or thumb) invades the fringe electric field 474, a portion of the electric field 468 is shunted to a ground 478 instead of terminating at the receiver 464. The resultant decrease in capacitance may be detected by the capacitance-to-digital converter 470 and may indicate capture of a particular type of user input (e.g., a hover-state and/or touch-state input), which may be referred to as a first type of user input.

The sensitivity of the capacitance sensor 460 may be set at higher or lower levels based on certain predetermined adjustments, as may suit a particular implementation. Higher sensitivity levels may be used to detect the approaching object 476 at a greater distance away from the surface of the sensor 460 than when the sensitivity is set at lower levels. In certain embodiments, the sensitivity may be set at a low enough level that the object 476 must make actual contact with the sensor 460 (e.g., the plastic cover 461 of the sensor 460) before the first type of user input will be detected. In other embodiments, either actual contact with or hovering above the surface of the sensor 460 may be detected as the first type of user input.

In other embodiments, input device 113 may be configured to distinguish between an object touching and an object hovering over sensor 460. For example, a capacitance threshold may be set and used as a dividing line for determining whether an object hovering over or touching a surface of the sensor 460 has caused a decrease in capacitance at the sensor 460. Relatively smaller decreases in capacitance that are below the threshold may indicate an object hovering over sensor 460 (i.e., a hover-state input), and relatively larger decreases in capacitance that are at or above the threshold may indicate an object touching sensor (i.e., a touch-state input).

Sensor 460 may be implemented within, or in conjunction with, for example, a mechanical contact button. Accordingly, in addition to detecting touching and/or hovering inputs, sensing facility 310 may be configured to detect a state wherein the mechanical contact button is actuated (e.g., depressed). In some examples, object 476 may depress the plastic cover 461 of sensor 460 to move the mechanical contact button into a depressed position and trigger detection of another type of user input, which may be referred to as a second type of user input. In certain embodiments, sensor 460 may be implemented within, or in conjunction with, a single mechanical contact button, and the plastic cover 461 may form a surface of the mechanical contact button.

The capacitance-to-digital converter 470 may output data or another signal indicating a detection of user input. Returning to FIG. 3, the output data or signal may be provided from the capacitance-to-digital converter 470 to the control facility 320, which may be configured to process the data or signal, including determining a type of user input indicated by the data or signal.

The control facility 320 may include or be implemented as software, hardware (e.g. processor), or a combination thereof (e.g., a processor configured to function as instructed by software). The control facility 320 may include a control signal generator 330 configured to generate one or more control signals, which may be provided from the user input device 113 to the processing subsystem 110.

The control facility 320 may be configured to generate and provide control signals based on the data or signal received from the sensing facility 310. Accordingly, a particular control signal may be generated and provided based on a detected user input or user input type. For example, the control facility 320 may be configured to provide a first control signal in response to capture of a first type of user input and to provide a second distinct control signal in response to capture of a second type of user input.

The control facility 320 and/or another component of the user input device 113 may be configured to provide one or more of the generated control signals to the processing subsystem 110. The control signals may be transmitted using any suitable communications technologies and media. In certain embodiments, wireless communication technology is used, such as infrared or radio frequency technology. Accordingly, control facility 320 may be configured to transmit, or initiate transmission of, infrared control signals or radio frequency control signals that may be detected and decoded by the processing subsystem 110. However, it will be recognized that the control facility 320 may be configured to transmit, or initiate transmission of, control signals to the processing subsystem 110 using any suitable communication technologies.

The control signals may be configured to trigger certain actions, which may include execution of functions, preview events, or other operations performed by the processing subsystem 110. In certain embodiments, for example, a first control signal associated with a first input type may be configured to trigger a preview event for a function associated with the sensing facility 320 that captured the first type of user input, and a second control signal associated with a second input type may be configured to trigger execution of the function. Examples of such functions and associated preview events will be described further below.

The control facility 320 may be configured to provide a user-controllable mode for activating and deactivating sensor 460. Accordingly, a user may turn a mode on or off to respectively activate or deactivate sensor 460. The user-controllable mode may be turned on and off in any suitable way, including the user providing input to the user input device 113 (e.g., by actuating a predetermined button on the user input device 113). This allows the user to control whether a first input type will be captured and whether preview events will be actively provided. Alternatively or additionally, processing subsystem 110 may be configured to activate and deactivate preview events by turning a preview event mode on or off based on user input.

An apparatus including sensing facility 310 and control facility 320 may be implemented within a wide range of devices. For example, the facilities 310 and 320 may be implemented within a telephone handset device (e.g., a mobile telephone device) or a remote control device such as a remote control device configured to communicate with processing subsystem 110.

Figure 5:
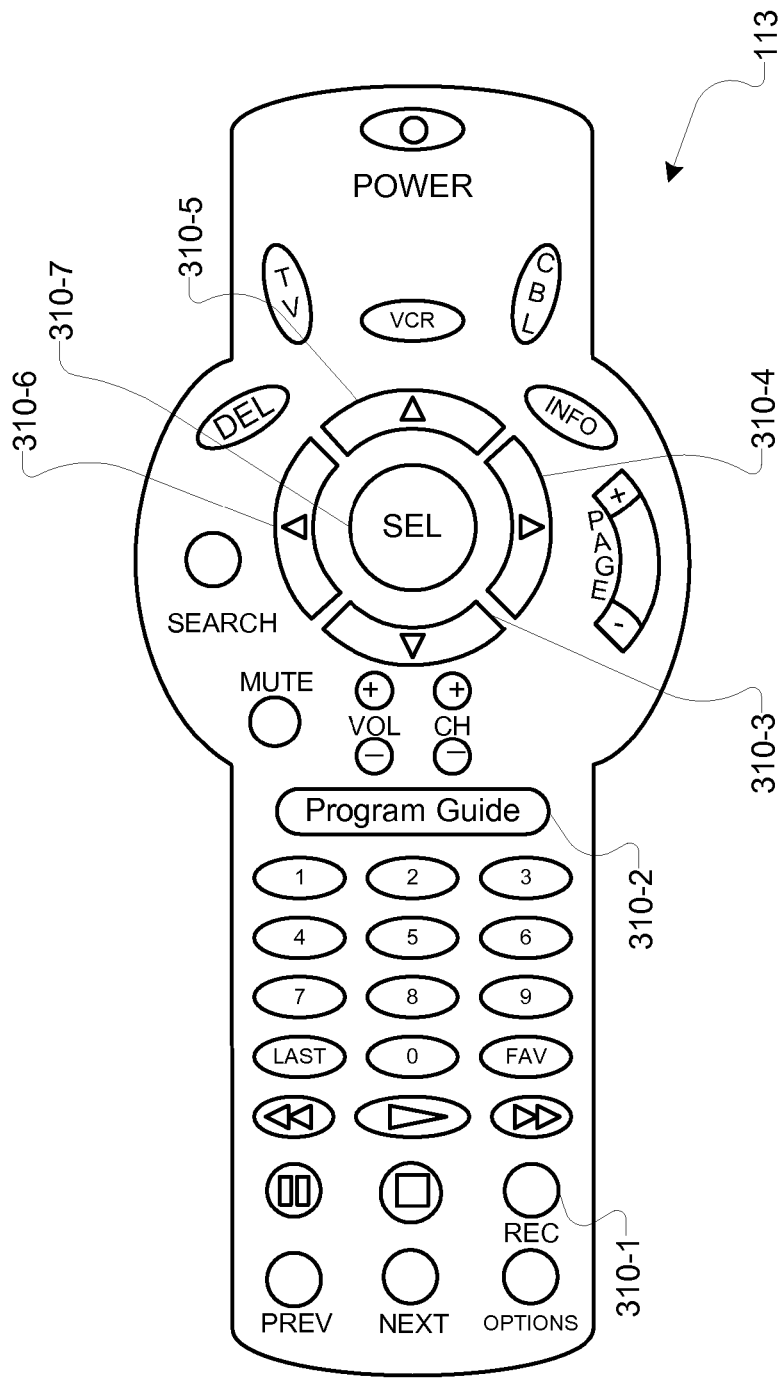
FIG. 5 illustrates an exemplary user input device.

FIG. 5 illustrates an exemplary user input device 113 in which one or more sensing facilities 310 and control facilities 320 may be implemented. As shown in FIG. 5, the user input device 113 may include a plurality of sensing facilities 310-1 through 310-7 included in or implemented as buttons (e.g., mechanical contact buttons) on the user input device 113. For simplicity, callouts to reference number 310-1 through 310-7 are shown for several of the sensing facilities 310 included in the user input device 113. However, any of the buttons on the user input device 113 may include or be implemented as sensing facilities 310.

Sensing facilities 310 may be configured to enable a user to control (e.g., initiate) various functions that may be executed by the processing subsystem 110. The term "function" is used herein to refer expansively to any process, action, procedure, operation, or pre-programmed response that may be performed. A function may be executed, for example, by the processing subsystem 110 and may include processes of applications or application clients residing in and executed by the processing subsystem 110.

Certain sensing facilities 310 may be associated with certain functions. For example, a "record" button 310-1 may be included and configured to enable a user to control recording of media content (e.g., starting recording, stopping recording, and/or programming a timer for future recording). A program guide button 310-2 may be configured to evoke a display of a program guide graphical user interface on display 112. A left button, right button, up button, down button, and select button may also be included and configured to enable the user to evoke and/or navigate through various views and graphical user interfaces displayed by the display 112.

In certain embodiments, each sensing facility 310 that is a part of the user input device 113 may be associated with a unique control code (e.g., a binary word). Hence, when a particular sensing facility 310 is actuated (e.g., depressed), the user input is detected and a control signal including a control code corresponding to the sensing facility 310 is generated and transmitted to the processing subsystem 110. The processing subsystem 110 may be configured to user the unique control code to recognize which particular sensing facility 310 was actuated. Accordingly, the processing subsystem 110 may be configured to recognize a control code and execute a function associated with the specified sensing facility 310 corresponding to the control code.

Functions may be statically or dynamically associated with sensing facilities 310 (control codes corresponding to the sensing facilities 310). As an example of a dynamic association, different functions may be associated with a sensing facility 310 based on the context in which the sensing facility 310 is actuated. The context may be determined based on a processing state of, or previous operations performed by, the processing subsystem 110. For example, a sensing facility 310 including a "power" button may be associated with and configured to initiate execution of a "power on" function when actuated while the processing subsystem 110 is "off" and configured to initiate execution of a "power off" function when actuated while the processing subsystem 110 is "on." Other examples of functions being associated with a sensing facility 310 based on the processing state of the processing subsystem 110 will be described further below.

Control signals may also include data configured to enable the processing subsystem 110 to determine the type of user input that was captured at the respective sensing facility 310. For example, a typical control code for a sensing facility 310, by itself, may represent capture of a second type of user input (e.g., depressing a button), which may be a user input type configured to trigger execution of an associated function. A control signal including the control code and an appendage (e.g., a header or added bit value) to the control code may represent capture of a first type of user input (e.g., a touching or hovering input) at the sensing facility 310, which may be a user input type configured to trigger a preview event for the function. For example, a control code associated with capture of a second type of user input at a "record" button on the user input device 113 may include a unique 8-bit control code such as "0000 1001," and the control code associated with capture of a first type of user input at the "record" button may include "0001 1001." These exemplary control codes may be referred to as first and second distinct control codes, and the control signals including these control codes may be referred to as first and second distinct control signals, respectively. Accordingly, two distinct control codes and/or control signals may be generated and provided for each sensing facility 310. Accordingly, processing subsystem 110 may be configured to identify, from a control signal, a particular sensing facility 310 at which user input was captured, as well as the type of user input that was captured. The above-described example is illustrative only. Other control codes and/or control code schemes may be suitably implemented in other embodiments.

It will be recognized that the user input device 113 shown in FIG. 5 is merely illustrative of one of the many different types of input devices that may be used in connection with the apparatuses, systems, and methods described herein. Additional or alternative components, implementations, devices, or methods, may be used to implement the principles described herein. For example, the user input device 113 may include, but is in no way limited to, a television set-top box remote control, a telephone handset (e.g., a mobile telephone handset), a mobile entertainment device, a remote control device, or other portable device. Moreover, user input device 113 may be a device with actual mechanical contact buttons or keys, or may be, for example, an interactive visual display device such as a touch screen device that may detect an object, such as a user's finger 176, stylus or other object, touching or hovering over the screen.

The user input device 113 may be configured to provide any of the above-described control signals to the processing subsystem 110. As an example, when a user of the input device 113 places a finger in a hovering or touching position over the "record" button, the user input device 113 may generate and provide a first control signal, which may be configured to trigger execution of a function associated with the "record" button. When the user actuates the "record" button, the user input device 113 may generate and provide a second control signal, which may be configured to trigger a preview event for the function. If the user places a finger in a hovering or touching position over the "program guide" button, the user input device 113 may generate and provide a third control signal, which may be configured to trigger execution of another function associated with the "program guide" button. If the user actuates the "program guide" button, the user input device 113 may generate and provide a fourth control signal, which may be configured to trigger a preview event for the other function. Exemplary components and processes associated with the processing subsystem 110, including processing of control signals received from the user input device 113 and providing of preview events, will now be described.

FIG. 6 is a block diagram of an exemplary processing subsystem 110. The processing subsystem 110 may include any combination of hardware, software, and firmware configured to process media content, program guide data, and/or preview events for presentation to a user by display 112. Processing subsystem 110 may include one or more receivers that receive and process digital and/or analog media content. An exemplary processing subsystem 110 may include, but is not limited to, a set-top box ("STB"), home communication terminal ("HCT"), digital home communication terminal ("DHCT"), stand-alone personal video recorder ("PVR"), DVD player, handheld entertainment device, video-enabled phone (e.g., a mobile phone), and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on multiple physical computing devices. Accordingly, processing subsystem 110 may include any one of a number of well known computing devices, and may employ any of a number of well known computer operating systems, including, but by no means limited to, known versions and/or varieties of the Microsoft Windows, UNIX, Macintosh, and Linux operating systems.

Accordingly, the processes described herein may be implemented at least in part as instructions executable by one or more computing devices. In general, a processor (e.g., a microprocessor) receives instructions from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer. Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 6, the exemplary components illustrated in FIG. 6 are not intended to be limiting. Indeed, additional or alternative components and/or implementations may be used. Various components of the processing subsystem 110 will now be described in additional detail.

As shown in FIG. 6, the processing subsystem 110 may include a communication interface 631 configured to receive content (e.g., media content) and/or data (e.g., program guide data) in any acceptable format from the media content provider 111 or from any other suitable media content source. The communication interface 631 may include any device, logic, and/or other technologies suitable for receiving signals and/or data representative of media content and/or other types of content or data. The communication interface 631 may be configured to interface with any suitable communication media, protocols, and formats, including any of those mentioned above.

In certain embodiments, the communication interface 631 may include a single port configured to receive media content and/or program guide data from the media content provider 111 and/or from any other source. For example, the communication interface 631 may include or be connected to a broadband connection, which can enable the processing subsystem 110 to receive media content from one or more sources on a single port. In other embodiments, multiple ports may be used.

The processing subsystem 110 may also include a receiver 632 configured to receive control signals from the user input device 113, including any of the control signals described above. The receiver 632 may include and/or utilize any suitable technologies for receiving control signals from the user input device 113, including any of the communication technologies mentioned herein.

The processing subsystem 110 may also include an output driver 633 configured to interface with or drive the display 112. As instructed by one or more processors of the processing subsystem 110, the output driver 633 may provide output signals to the display 112, the output signals including content (e.g., media content, program guide content, and/or preview event content) to be presented by the display 112 to the user. For example, the output driver 633 may provide to the display 112 data representative of a graphical user interface including a preview event for a function associated with a sensing facility 310 on a user input device 113. The output driver 633 may include any combination of hardware, software, and firmware as may serve a particular implementation.

Storage device 634 may include one or more data storage media, devices, or configurations and may employ any type, form, and combination of storage media. For example, the storage device 634 may include, but is not limited to, a hard drive, network drive, flash drive, magnetic disc, optical disc, or other non-volatile storage unit. Media content, program guide data, control codes, and other data may be temporarily and/or permanently stored in the storage device 634.

The storage device 634 of FIG. 6 is shown to be a part of the processing subsystem 110 for illustrative purposes only. It will be understood that the storage device 634 may additionally or alternatively be located external to the processing subsystem 110.

The processing subsystem may also include memory 635. Memory 635 may include, but is not limited to, FLASH memory, random access memory ("RAM"), dynamic RAM ("DRAM"), or a combination thereof. In some examples, as will be described in more detail below, various applications used by the processing subsystem 110 may reside in memory 635.

As shown in FIG. 6, the storage device 634 may include one or more live cache buffers 636. The live cache buffer 636 may additionally or alternatively reside in memory 635 or in a storage device external to the processing subsystem 110. In some examples, media content data and/or program guide data may be temporarily stored in the live cache buffer 636 to facilitate viewing of the media and/or program guide content.

Tuner 637 may be configured to selectively receive content (e.g., media content) carried on a particular content channel. For example, tuner 637 may be tuned to a particular content channel such that the content carried on the content channel is received and can be processed by the processing subsystem 110.

In some examples, the processing subsystem 110 may include multiple tuners 637 such that content carried on different content channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 637 is temporarily buffered, or stored, in the live cache buffer 636. If there are multiple tuners 637, there may be a live cache buffer 636 corresponding to each of the tuners 637.

While tuner 637 may be used to receive various types of content-carrying signals broadcast by media content provider 111, processing subsystem 110 may be configured to receive other types of content signals from the media content provider 111 without using a tuner. For example, media content provider 111 may broadcast digital streams of data packets, such as Internet Protocol ("IP") based data packets, which can be received without using a tuner. For such types of content signals, the communication interface 631 may receive and forward the signals directly to other components of the processing subsystem 110 (e.g., a processor 638 or signal processing unit 639) without going through the tuner 637. For an IP-based signal, for example, the signal processing unit 639 may function as an IP receiver.

As shown in FIG. 6, the processing subsystem 110 may include one or more processors, such as processor 638 configured to control the operations of the processing subsystem 110. The processing subsystem 110 may also include a signal processing unit 639 configured to process incoming media content. The signal processing unit 639 may be configured, for example, to demodulate and parse encoded digital media content. In some examples, the processing subsystem 110 may include one or more signal processing units 639 corresponding to each of the tuners 637. Control signals received from the user input device 113 may be processed by the processor 638 and/or any other suitable component(s) of the processing subsystem 110.

The processing subsystem 110 may also include a graphics engine 640 configured to generate graphics that are to be displayed by the display 112. The graphics may include graphical user interfaces directed to, for example, media content presentations, program guide GUIs, preview events for functions, and other graphics.

One or more applications residing within the processing subsystem 110 may be executed upon initiation by a user of the processing subsystem 110, or upon the occurrence of another predetermined function. The applications, or application clients, may reside in memory 635 or in any other area of the processing subsystem 110 and be executed by the processor 638.

As shown in FIG. 6, the processing subsystem 110 may include a personal video recording ("PVR") application 641 and program guide application 642 residing in memory 635. The program guide application 642 may be configured to instruct components of the processing subsystem 110 (e.g., the processor 638 and/or the graphics engine 640) to generate and provide data representative of a program guide GUI having a view of a program guide, that may be provided for presentation on the display 112. PVR application 641 may be configured to instruct one or more components of the processing subsystem 110 to execute media recording operations such as scheduling, initiating, pausing, and stopping recording operations, for example.

As is also shown in FIG. 6, the processing subsystem 110 may include a function preview application 643. The function preview application 643 may be configured to instruct one or more components of processing subsystem 110 to perform any of the function previewing operations described herein, including decoding control codes in control signals and providing one or more preview events for functions based on the control codes.

The term "preview event" refers generally to any description, information, context, preview, content, or other information provided to a user about a function associated with a particular sensing facility 310. A preview event may assist the user by providing context about what will occur if a particular sensing facility 310 is actuated and its corresponding function executed, additional information about the operation of the function, or a preview of the function. A preview event may be communicated visually, audibly, and/or through other communication methods suitable for presenting information to a user. In some embodiments, certain preview events are provided to display 112 for visual presentation to a user.

Function preview application 643 may be configured to initiate a preview event in response to receiving a control signal indicating capture of a first type of user input at a sensing facility 310. If a second type of user input is captured at the sensing facility 310, the processing subsystem 110 may execute the function associated with the sensing facility 310.

To facilitate an understanding of the function preview application 643 and exemplary preview events, FIGS. 7, 8A, and 8B illustrate exemplary views as may be presented by display 112. FIG. 7 illustrates a viewing screen 710 (or simply, "screen 710") of an exemplary display 112 with a particular scene or frame of a media content instance displayed thereon. In some examples, a user may be interested in recording the media content instance. The user may actuate an appropriate sensing facility 310 to initiate a recording (an actuation state input), such as by pressing a "record" button on the user input device 113, which button may be associated with a recording function. According to the principles described herein, the user may also be able to initiate a preview event for the recording function by positioning an object 476 on or proximate to the "record" button (i.e., a hover or touch state input).

When the "record" button of the user input device 113 captures a first type of user input (e.g., an object touching or hovering over the "record" button), the user input device 113 generates and provides an appropriate first control signal to the processing subsystem 110, as described above. Function preview application 643 may be configured to direct one or more components of the processing subsystem 110 to decode the control signal, and based on the control code included therein, provide a preview event for the function associated with the "record" button.

FIG. 8A illustrates an exemplary preview event displayed on viewing screen 710. As shown, the preview event may include display of a graphical user interface 810-1 including function preview information. The graphical user interface 810-1 may be presented to the user in any number of ways or locations on the screen 710. For example, the graphical user interface 810-1 may include a translucent or transparent window, which window may fade in and appear when a sensing facility 310 associated with the "record" button detects a first type of user input (e.g., an object touching or hovering over the "record" button), and may fade out and disappear from the screen 710 when the object moves to a position no longer touching or hovering over the "record" button. The preview event may be presented in other ways, including as a pop-up image, an overlay, scrolling text or any other suitable way for communicating or providing preview information to the user.

In certain embodiments, a preview event may be presented audibly to the user, or it may be presented in a form using a combination of visual and audible techniques. For example, the preview event may be presented visually to the user on the screen 180 while being audibly presented to the user through pre-recorded voice playback. This technique may assist younger children or others who are not able to read or those who may have difficulty clearly seeing information displayed on the screen 710.

In certain embodiments, a preview event may be descriptive of a function associated with, and that will be executed if a second type of user input is detected at, the "record" button. In the example of FIG. 8A, the preview event includes information notifying a user that actuating the "record" button will cause the processing subsystem 110 to begin recording the current media content instance with no set ending time, and that the recording will need to be stopped manually by the user. If the user desires to execute this "recording" function, the user may then provide a second type of user input such as by actuating the "record" button (e.g., depressing the button if the button is mechanical contact button). The user input device 113, upon detecting such user input, may then send a second control signal to the processing subsystem 110, the second control signal being configured to trigger execution of the recording function. The processing subsystem 110 may receive the second control signal, identify the control code included therein, and execute the function to record the selected media content instance.

As another example, if a user holds a finger on or proximate to a sensing facility 310 including a "program guide" button on the user input device 113, processing subsystem 110 may receive another distinct control signal and provide a preview event such as launching and displaying a graphical user interface including preview information for another function associated with a "program guide" button. The "program guide" function may include launching and displaying a program guide GUI, which may be executed when the user actuates the "program guide" button to provide a second type of user input.

As mentioned above, in certain embodiments, a function may be dynamically associated with a sensing facility 310 based on the context or processing state of the processing subsystem 110. A preview event may also be identified and provided based on the context or processing state of the processing subsystem 110. For example, a preview event may be identified and presented to a user based, at least in part, on certain functions previously selected by the user or certain functions being currently executed by the processing subsystem 110. Information in a preview event may be selected and included in the preview event based on the context in which a sensing facility 310, such as a "record" button, captures user input. For example, if a recording is already in progress when the user input is captured, a preview event for the "record" button may inform the user that by actuating the "record" button, a different recording function other than initiating a recording may be executed, such as stopping the recording or adding additional time (e.g. 15 minutes) to a recording timer.

FIG. 8B illustrates another exemplary preview event displayed on the viewing screen 710. In this example, when a sensing facility 310 associated with the "record" button of the user input device 113 captures a first type of user input, a preview event is displayed in or as a graphical user interface 810-2 on screen 710. As shown, the preview event may include one or more selectable options related to a function corresponding to the "record" button. In FIG. 8B, the selectable options include: (1) start a recording of the media program with the recording to be stopped manually by the user; (2) record the entire media program selected; or (3) create a recurring timer for a recurring recording event. It will be recognized that additional or alternative options may be included within the preview event as may serve a particular application.

From the preview event, the user may select one of the selectable options. The user may select one of the option in any suitable way, including, for example, by using another sensing facility 310 such as an "up" button or "down" button of the user input device 113 to highlight the desired option and then registering the option by actuating the "record" button with a second type of user input (e.g. depressing the "record" button). Other methods for selecting one of the selectable options may include, for example, the user pressing one of the numerically labeled buttons on the user input device 113 corresponding to the desired option (e.g., the "1" button on user input device to select the first selectable option).

In certain embodiments, preview events may be presented in or as "control panes" such as are described in U.S. patent application Ser. No. 11/542,352, filed Oct. 3, 2006, and titled "Control Tools for Media Content Access Systems and Methods," the disclosure of which is hereby incorporated by reference in its entirety. Accordingly, when an object such as a user's finger hovers over or touches a component of a sensing facility 310 (e.g., a "select" button on the user input device), one or more control panes may be displayed in screen 710. For example, a first control pane may be displayed proximate the left border of the screen 710, a second control pane may be displayed proximate a right border of the screen 710, a third control pane may be displayed proximate a bottom border of the screen 710, and a fourth control pane may be displayed proximate a top border of the screen 710. By hovering over or touching another sensing facility 310 (e.g., a "left," "right," "down," or "up" button on the user input device 113), the user may be provided with a preview of the contents included in the respective control panes. By actuating the sensing facility 310, the respective control pane may be opened, providing additional features, options, or functionality to the user.

Figure 9:
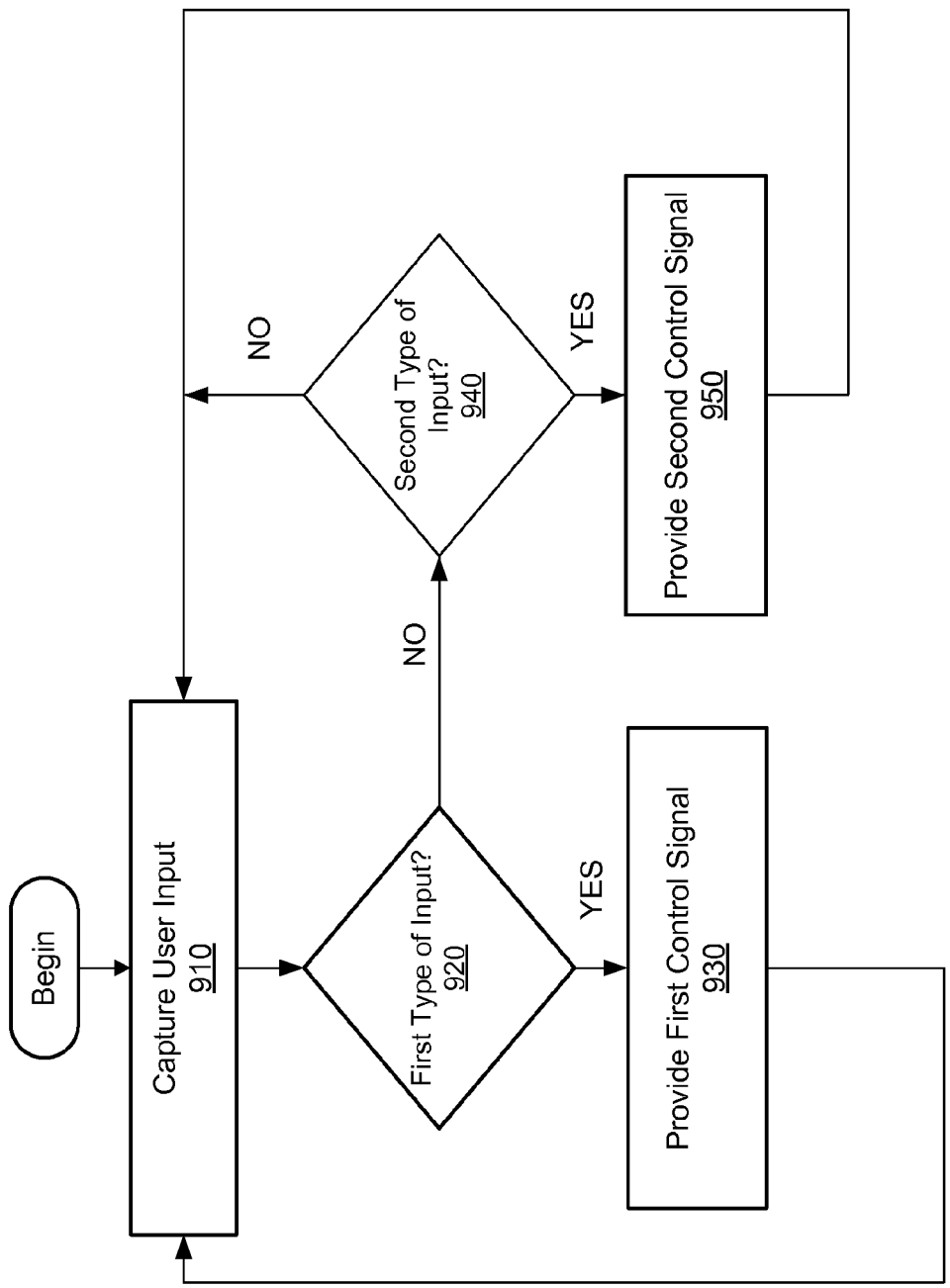
FIG. 9 is a flow diagram illustrating an exemplary method of capturing and processing user input.

FIG. 9 is a flow diagram illustrating an exemplary method of capturing and processing user input. While FIG. 9 illustrates exemplary steps according to certain embodiments, other embodiments may omit, add to, reorder, and/or modify any of the steps shown in FIG. 9.

In step 910, user input is captured. Step 910 may be performed in any of the ways described above. For example, in certain embodiments, a user input may be captured by a sensing facility 310 of a user input device 113.

In step 920, a determination is made whether the user input captured is a first type of user input. Step 920 may be performed in any of the ways described above. For example, a determination may be made whether the user input includes an object hovering within a certain distance of a component (e.g., sensor 460) of a sensing facility 310. Or, in certain embodiments, a determination may be made whether a component of the sensing facility 310 is being touched by an object.

If the user input is a first type of user input, the method continues at step 930. In step 930, a first control signal is provided. The first control signal may be configured to trigger a preview event for a function. Step 930 may be performed in any of the ways described above. For example, in certain embodiments, control facility 320 may be configured to generate and provide a control signal in response to the capture of the first type of user input. In one example, the first control signal includes a control code and an appendage to a control code, as described above. The method may return to step 910 to await capture of additional user input.

Returning to step 920, if it is determined that the user input is not a first type of user input, the method continues at step 940. In step 940, a determination is made whether the user input is a second type of user input. Step 940 may be performed in any of the ways described above. For example, a determination may be made whether the user input includes actuation of the sensing facility 310 such as movement to a depressed position.

If the user input is determined to be a second type of user input, the method continues at step 950. In step 950, a second control signal is provided. The second control signal may be configured to trigger execution of a function associated with the sensing facility 310. Step 950 may be performed in any of the ways described above. In certain embodiments, this second control signal includes a control code configured to trigger the execution of the function.

Returning to step 940, if the user input is determined not to be a second type of user input, the method may return to step 910 to await capture of additional user input.

Figure 10:
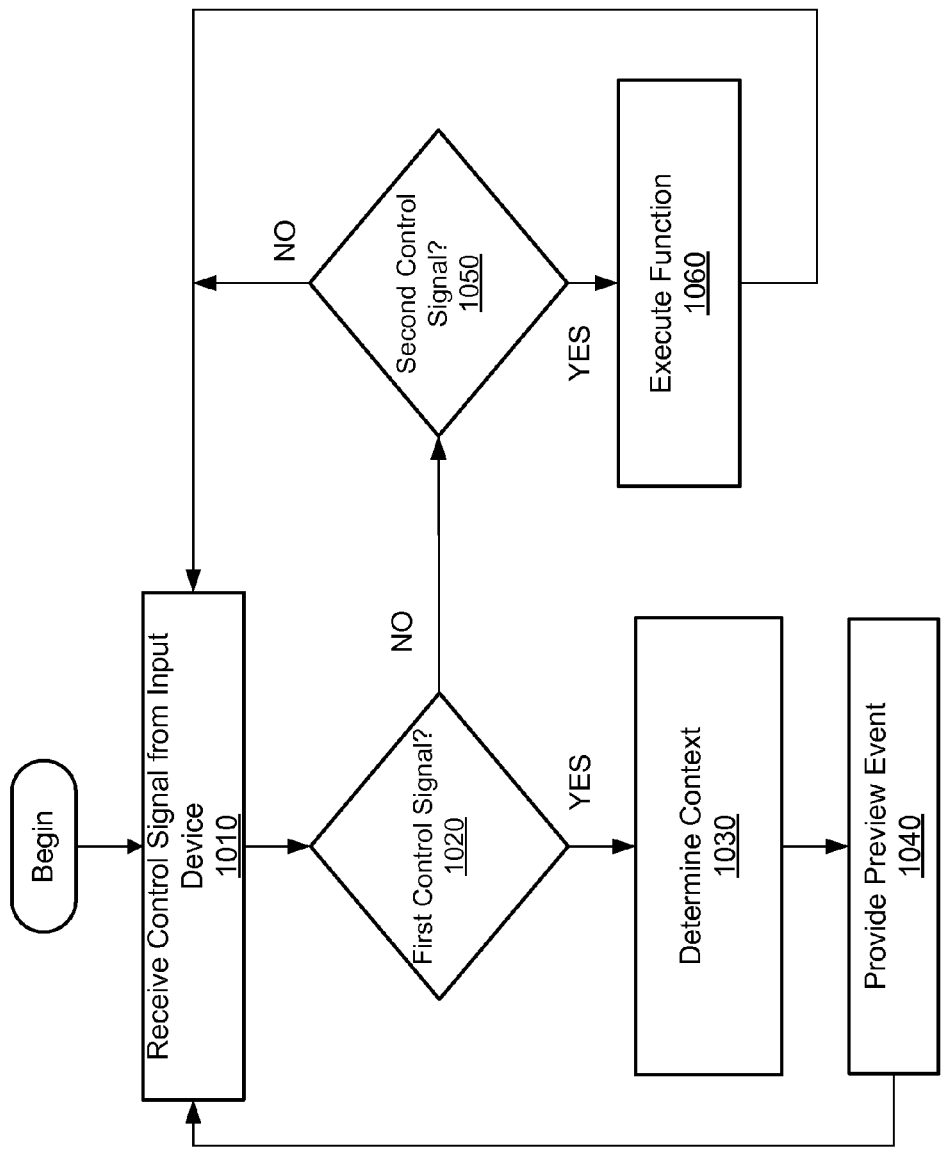
FIG. 10 is a flow diagram illustrating an exemplary method of providing a preview event for a function.

FIG. 10 illustrates an exemplary method of providing a preview event for a function. While FIG. 10 illustrates exemplary steps according to certain embodiments, other embodiments may omit, add to, reorder, and/or modify any of the steps shown in FIG. 10.

In step 1010, a control signal is received from an input device. Step 1010 may be performed in any of the ways described above. For example, processing subsystem 110 may receive a control signal from the user input device 113.

In step 1020, a determination is made whether the control signal is a first control signal, such as a first control signal generated in response to a capture of a first type of user input. Step 1020 may be performed in any of the ways described above, including determining if the control signal includes an appendage indicative of a first type of user input. If the control signal is determined to be a first control signal, the method continues at step 1030.

In step 1030, context may be determined. This may include determining a processing state and/or functions that were previously executed or are currently being executed by the processing subsystem 110. Step 1030 may be performed in any of the ways described above.

In step 1040, a preview event for a function is provided. Step 1040 may be performed in any of the ways described above, including presenting a preview event in a graphical user interface on a display. In certain embodiments, the preview event may be selected or generated and provided based, at least in part, on the context determined in step 1030. The method may then return to step 1010 to await receipt of an additional control signal.

Returning to step 1020, if it is determined that control signal is not a first control signal, the method continues at step 1050. In step 1050, a determination is made whether the control signal is a second control signal. Step 1050 may be determined in any of the ways described above, including determining whether the control signal includes or does not include an appendage. If the control signal is determined to be a second control signal, the method continues at step 1060.

In step 1060, a function associated with the sensing facility 310 may be executed. Step 1060 may be performed in any of the ways described above, including processing subsystem 110 executing the function. In some embodiments, step 1060 may include determining a context and the function associated with the sensing facility 310 based on the context.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system comprising:
 a processing subsystem; and
 an input device configured to remotely communicate with the processing subsystem and comprising at least one sensing facility and a control facility,
  the at least one sensing facility configured to detect a first type of user input and a second type of user input, and
  the control facility communicatively coupled to the sensing facility and configured to provide a first control signal in response to detection of the first type of user input, and
provide a second control signal in response to detection of the second type of user input;
wherein the first and second control signals contain:
a same control code that identifies a function to be triggered by the sensing facility detecting the second type of user input, and
an appendage to the same control code that indicates whether the first type or the second type of user input is detected by the sensing facility; and
wherein the processing subsystem is configured to
receive the first control signal from the input device, and
in response to receiving the first control signal,
determine the control code included in the first control signal,
determine the function identified by the control code,
determine that the sensing facility detected the first type of user input based on the appendage included in the first control signal, and
provide a preview event for the function.

2. The system of claim 1, wherein the preview event comprises information descriptive of the function.

3. The system of claim 1, wherein the preview event comprises at least one of a pop-up window, a translucent or transparent window, a pop-up image, and an overlay in a graphical user interface.

4. The system of claim 1, wherein the preview event comprises a plurality of selectable options related to the function.

5. The system of claim 1, wherein the sensing facility comprises:
a mechanical contact button configured to capture the second type of user input; and
at least one sensor configured to capture the first type of user input, the sensor comprising at least one of a capacitance sensor, a light sensor, a heat sensor, and a photo sensor film configured to detect an object positioned proximate to a surface of the mechanical contact button.

6. The system of claim 5, wherein the mechanical contact button is configured to capture the second type of user input through a movement of the mechanical contact button to a depressed position.

7. The system of claim 1, wherein the processing subsystem comprises a set-top box.

8. The system of claim 1, wherein the processing subsystem is configured to determine the function that is identified by the control code by determining a context and identifying the function based on the context.

9. The system of claim 1, wherein the first type of user input comprises at least one of a hover-state input and a touch-state input.

10. The system of claim 1, wherein the processing subsystem is further configured to
receive the second control signal from the input device, and
in response to receiving the second control signal,
determine the control code that is included in the second control signal,
determine that the sensing facility detected the second type of user input based on the appendage, and
execute the function that is identified by the control code.

11. The system of claim 1, wherein
the sensing facility comprises a capacitance sensor, and
the input device is configured to detect the first type of user input by the capacitance sensor detecting a decrease in capacitance.

12. The system of claim 11, wherein the the input device is configured to determine that an object is hovering over the capacitance sensor based on the decrease in capacitance being below a capacitance threshold, and to determine that the object is touching the capacitance sensor based on the decrease in capacitance being at or above the capacitance threshold.

13. The system of claim 1, wherein the control code and the appendage are binary words appended to each other.

14. The system of claim 1, wherein the appendage comprises at least one bit value appended to the control code.

15. An apparatus comprising:
a sensing facility configured to capture a first type of user input and a second type of user input; and
a control facility communicatively coupled to the sensing facility, the control facility configured to
provide a first control signal in response to capture of the first type of user input, and
provide a second control signal in response to capture of the second type of user input;
wherein the first and second control signals contain:
a same control code that identifies a function to be triggered by the sensing facility capturing the second type of user input, and
an appendage to the same control code that indicates whether the first type or the second type of user input is captured by the sensing facility; and
wherein the appendage included within the first control signal is configured to trigger a preview event for the function by indicating that the sensing facility captured the first type of user input.

16. The apparatus of claim 15, further comprising:
another sensing facility communicatively coupled to the control facility and configured to capture the first type of user input and the second type of user input;
wherein the control facility is configured to
provide a third control signal in response to capture of the first type of user input, and
provide a fourth control signal in response to capture of the second type of user input; and
wherein the third and fourth control signals contain:
another same second control code that identifies another function to be triggered by the another sensing facility capturing the second type of user input, and
an appendage to the another same second control code that indicates whether the first type or the second type of user input is captured by the another sensing facility; and
wherein the appendage to the another same second control code included within the third control signal is configured to trigger another preview event for the another function by indicating that the another sensing facility captured the first type of user input.

17. The apparatus of claim 15, wherein the sensing facility comprises:
a mechanical contact button configured to capture the second type of user input; and
at least one sensor configured to capture the first type of user input, the sensor comprising at least one of a capacitance sensor, a light sensor, a heat sensor, and a photo sensor film configured to detect an object positioned proximate to a surface of the mechanical contact button.

18. The apparatus of claim 17, wherein the mechanical contact button is configured to receive the second type of user input through a movement of the mechanical contact button to a depressed position.

19. The apparatus of claim 17, wherein the control facility is configured to provide a user-controllable mode for activating and deactivating the at least one sensor for capture of the first type of user input.

20. The apparatus of claim 15, wherein the apparatus is implemented within either a telephone handset or a remote control device configured to communicate with a set-top box.

21. The apparatus of claim 15, wherein the first user input comprises at least one of a hover state input and a touch state input, and the second user input comprises an actuation state input.

22. The apparatus of claim 15, wherein the first user input comprises a hover state input, and the second user input comprises at least one of a touch state input and an actuation state input.

23. A method comprising:
  receiving, by a processing subsystem, a first control signal from an input device in response to a sensing facility capturing a first type of user input;
  providing, by the processing subsystem, a preview event for a function in response to the first control signal, the function being associated with the sensing facility;
  receiving, by the processing subsystem, a second control signal from the input device in response to the sensing facility detecting a second type of user input; and
  executing, by the processing subsystem, the function associated with the sensing facility in response to the second control signal;
  wherein the first and second control signals contain:
    a same control code that identifies the function, and
    an appendage to the same control code that indicates whether the first type or the second type of user input is detected by the sensing facility.

24. The method of claim 23, wherein the sensing facility comprises:
  a mechanical contact button capturing the second type of user input; and
  at least one sensor capturing the first type of user input, the at least one sensor comprising at least one of a capacitance sensor, a light sensor, a heat sensor, and a photo sensor film configured to detect an object positioned proximate to the mechanical contact button.

25. The method of claim 23, wherein the providing the preview event comprises launching a graphical user interface in a display for presentation to a user, the graphical user interface comprising at least one of information descriptive of the function and a plurality of selectable options associated with the function.

26. The method of claim 23, further comprising determining, by the processing subsystem, a context and identifying the function associated with the sensing facility based on the context.

27. The method of claim 23, further comprising:
  receiving, by the processing subsystem, the second control signal from the input device in response to the sensing facility detecting the second type of user input;
  determining, by the processing subsystem, the control code included in the second control signal;
  determining, by the processing subsystem, the function that is associated with the sensing facility; and
  executing, by the processing subsystem, the function.

* * * * *